Fig. 2.

Nov. 8, 1932.  S. D. LOCKE ET AL  1,886,408
POWER LAWN MOWER
Filed Aug. 15, 1928   7 Sheets-Sheet 3

Nov. 8, 1932.   S. D. LOCKE ET AL   1,886,408
POWER LAWN MOWER
Filed Aug. 15, 1928   7 Sheets-Sheet 7

INVENTORS.
Sylvanus D. Locke
Henry J. Stegeman
BY Gifford & Scull
ATTORNEYS.

Patented Nov. 8, 1932

1,886,408

UNITED STATES PATENT OFFICE

SYLVANUS D. LOCKE, OF BRIDGEPORT, AND HENRY J. STEGEMAN, OF FAIRFIELD, CONNECTICUT, ASSIGNORS TO THE LOCKE STEEL CHAIN COMPANY, OF BRIDGEPORT, CONNECTICUT, A CORPORATION OF CONNECTICUT

POWER LAWN MOWER

Application filed August 15, 1928. Serial No. 299,658.

Our invention relates to lawn mowers and particularly to power mowers. The present invention is an improvement in some respects upon the machine shown and described in our copending application Serial No. 21,470, filed April 8, 1925, which has now matured into Patent No. 1,819,133.

Some of the advantages which we claim for our present machine are that it is of simple construction and of comparatively light weight; that it may be controlled completely by the operator without leaving his operative position; that the cutter means are substantially counterbalanced from the main frame; that the spacing shoe for determining the length of cut carries only a portion of the weight of the cutter means with resultant low friction; that the driving means for the rotary cutter are so arranged that the weight carried by the spacing shoe is not substantially affected by the driving means; that means for adjusting the rotary cutter with respect to the stationary cutter are such as to prevent damage to the cutter in the event that extraneous or foreign matter comes between the two cutters; that novel and improved clutch controlling means are provided; that means are provided for effectively cleaning the driving roll; that means are provided for sharpening the rotary cutter without moving it from its position in the machine and that improved means are provided for controlling the internal combustion engine. Other advantages will appear from the combination of parts hereinafter described.

Our invention will be better understood by reading the following detailed description in connection with the accompanying drawings showing one embodiment of our invention, and in which—

Fig. 12 is a section through the driving clutch;

Fig. 13 is a side elevation of the clutch operating means looking along the main shaft;

Fig. 14 shows an elevation of the clutch operating means at right angles to that shown in Fig. 13;

Fig. 15 shows the clutch operating means with the clutch out and the brake on;

Referring to Figs. 1, 2, 3 and 4, the machine comprises what may be termed a main frame consisting of members 1, 2, 3 cross member 4, and side members 5 and 6.

The driving roll (Fig. 4) is divided into two parts 7 and 8 each mounted at one end on ball bearings in side members 5 and 6. A differential mechanism 9 is provided between the other two ends of the members 7 and 8 with a space 10 circumferentially of the differential. The members 7 and 8 are mounted concentrically on the shaft 11 passing from the side frame 5 to the side frame 6 and carrying at one end a sprocket 12. A well-known form of differential is placed between the members 7 and 8. The form shown is the standard spur-gear differential well known in the mechanical arts. In the differential mechanism a central member 13 is splined to the shaft 11. Mounted on the member 13 are pinions 14 which in turn are on shafts 15, which shafts rotate with the member 13 and upon which shafts the pinions 14 may revolve. The pinions 14 mesh with gears 16 and 17 which are fastened through the sleeves 18 and 19 with the parts 8 and 7, respectively, and which parts 18 and 19 are free to revolve on the shaft 11. By this arrangement the parts 7 and 8 may rotate at different speeds to enable the machine to be turned in a short radius without substantial slippage of any part of the driving roll on the lawn, thus preventing injury to the lawn.

Figure 2:
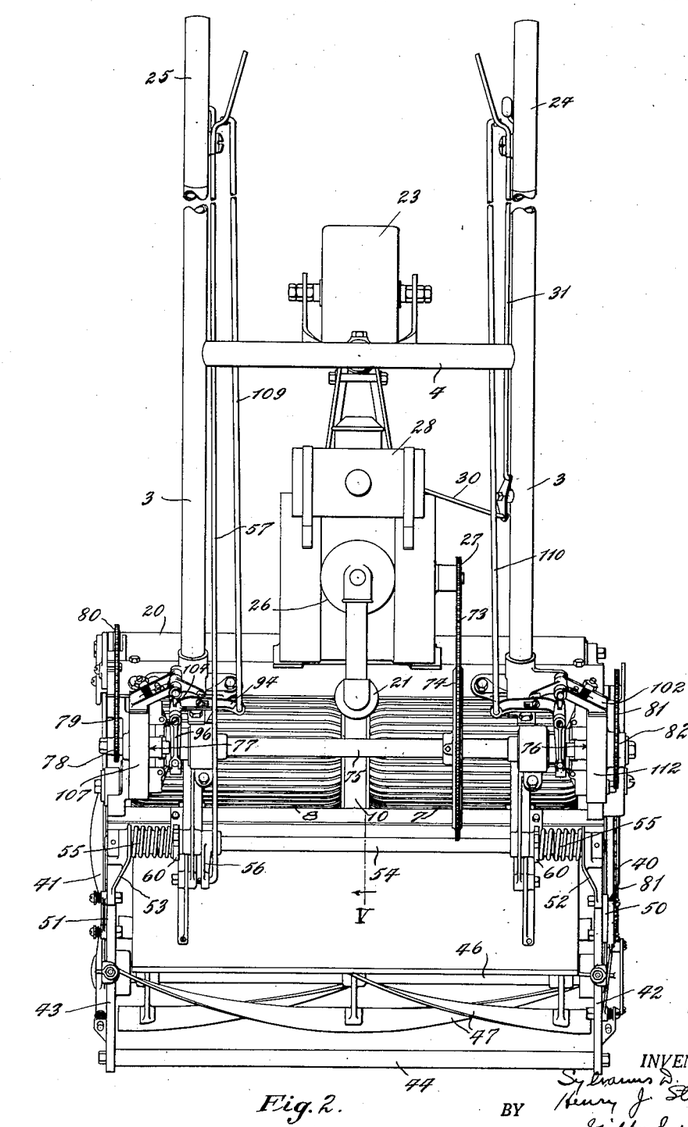
Fig. 2 is a top plan view of the machine.
Figure 4:
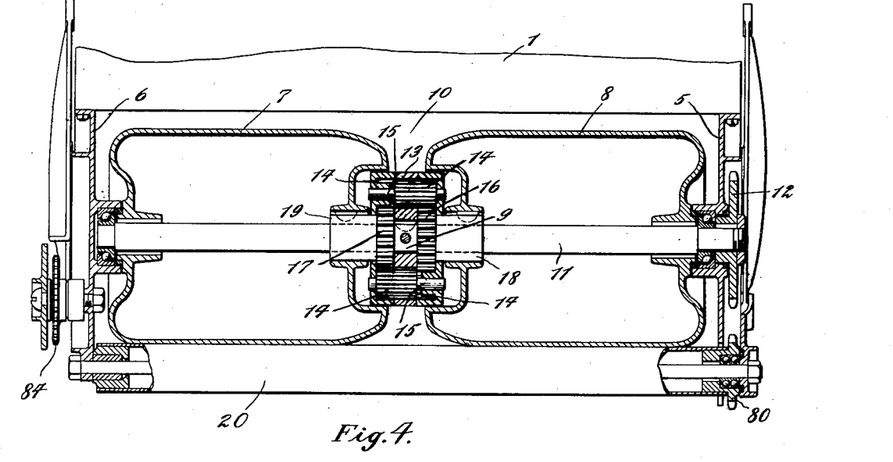
Fig. 4 is a horizontal section on line IV—IV of Fig. 6.
Figure 5:
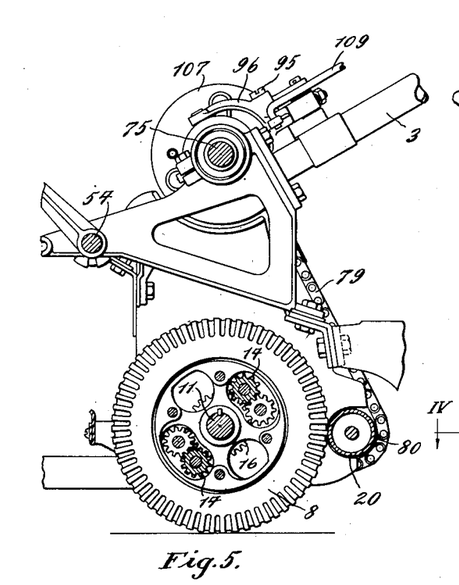
Fig. 5 is a vertical section on line V—V of Fig. 2, with the engine omitted.
Figure 6:
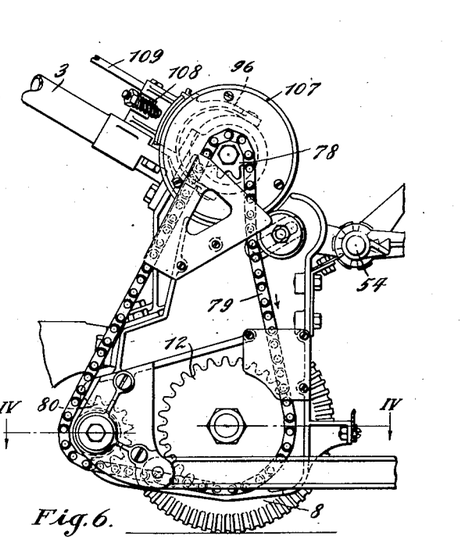
Fig. 6 is a right side elevation of certain parts of the machine.

In wet weather the cut grass frequently adheres to the exterior of the driving roll and frequently forms uneven cakes on the surface of the roll which if removed in cakes might damage the lawn and form unsightly spots thereon. We have therefore provided a cleaning roll 20 which operates in opposite direction to the parts 7 and 8 and in close proximity thereto, thus cleaning the same. In order to prevent the accumulation of mud and cut grass in the space 10 the exhaust 21 from the engine is directed downwardly into this space, as shown in Fig. 2. This exhaust acts to blow out the material that might temporarily accumulate therein and by the means described the driving roll is kept free from the accumulations on its surface.

Attached to the cross member 4 of the main frame is a standard 22 into the lower end of which is pivotally connected a caster 23. (See Fig. 18.) The main weight of the machine is carried by the driving roll 7—8 but a certain portion of the weight is carried by the caster 23 so that by the use of the two supporting means the machine is stabilized and yet may be easily guided by the handles 24 and 25 on the ends of the frame members 3. The motor 26 is mounted on the member 1 and is provided on the main crank shaft with a sprocket 27 for driving the machine, as will be presently described. The motor 26 is provided with the usual gasoline tank 28, carbureter 29 (Fig. 17) and means for regulating the speed of the engine, comprising a rod 30 leading to the handle 24 through rod 31. The rod 30 is connected at 33 with a bell crank 32 and connecting at the other end with a coiled spring 34 which in turn is connected through suitable mechanism to the engine throttle valve. A member 35 is pivoted at 36 and connects through a rod 37 with a link 38 which is also connected with the spring 34. The member 35 has a vane 35' on its end which is located in the air inlet passage A. These parts act as a speed governor in a well-known manner. By changing the position of the bell crank 32 in the notches 32' the setting of the engine throttle may be varied.

The cutter frame includes side members 42 and 43 connected together by cross members 44 and 45. Distance arms or links 40 and 41 connect the cutter frame to the main frame, and these arms are pivotally connected to the main frame and to the respective side or end members 42 and 43 of the cutter frame. The members 42 and 43 are connected together by cross members 44 and 45. A shaft 46 carries the rotary cutters 47 which rotate on ball bearings 48 in the members 42 and 43. A sprocket 49 is fastened onto one end of the shaft 46 and drives the rotary cutters.

The cutter frame and the rotary cutters are largely supported from the main frame by an arrangement consisting of links 50 and 51 and arms 52 and 53, together with the spacing members 40 and 41. The arms 52 and 53 are mounted on a rod 54 journaled in the main frame. Heavy coiled springs 55 surround the rod 54 at its ends and tend to raise the cutter frame so as to counterbalance the major portion of the weight of the cutter frame and the parts carried thereby. An arm 56 is attached to the rod 54 and a control rod 57 is connected to the arm 56 and leads to the handle 25 from which the cutter frame may be raised from the position shown in Fig. 1 to that shown in Fig. 3.

Mounted on the cutter frame is a spacing shoe 58, best shown in Figs. 7 to 10, inclusive. This shoe may be of any desired form but preferably is made of material with a rounded bottom and corrugated to prevent the spreading of worm casts. A flat or ungrooved shoe passing over a worm cast would spread it in the same manner as a mason's trowel while a grooved shoe does not. The shoe carries the stationary cutter 59 which cooperates with the rotary cutters 47. The shoe 58 is located rearwardly of the cutting edge of the stationary cutter. The spacing shoe 58 carries that part of the weight of the cutter frame and parts mounted thereon which is not counterbalanced by the link and arm means described above. By adjusting the springs 55 by the adjusting means 60, the portion of the weight of the cutter frame which is to be counterbalanced can be varied. It is desirable that enough weight be placed on the spacing shoe 58 to make sure that the shoe remains at all times in contact with the grass because it is the contact of the shoe 58 with the grass that determines the length of the cut.

Figure 7:
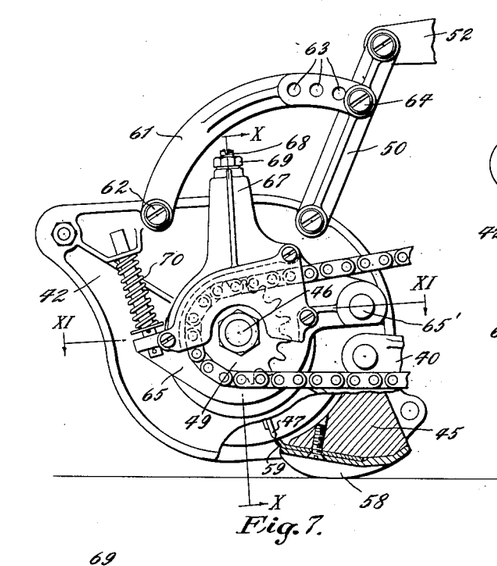
Fig. 7 is a side elevation of the cutter means with a portion broken away to show the spacing shoe.
Figure 8:
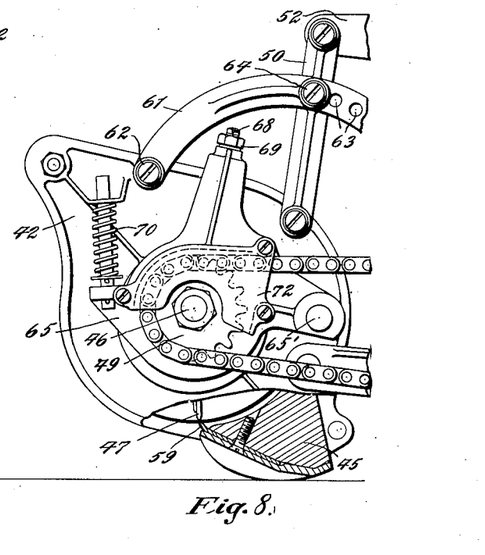
Fig. 8 is a view similar to Fig. 7 showing another adjustment of the cutting means.
Figure 9:
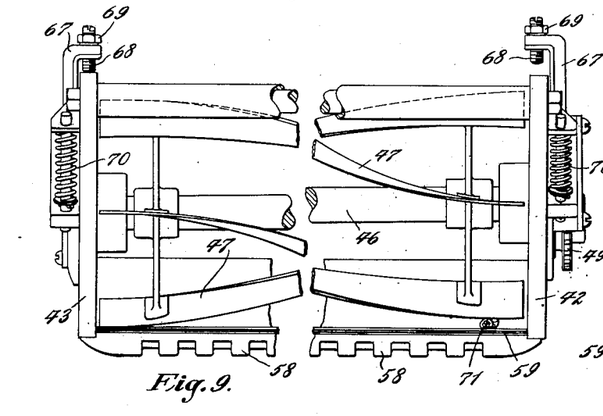
Fig. 9 is a front elevation of the cutter means showing an obstruction under one of the cutter blades with the parts in normal position at one end of the cutter and the self-adjusted position at the other end.
Figure 10:
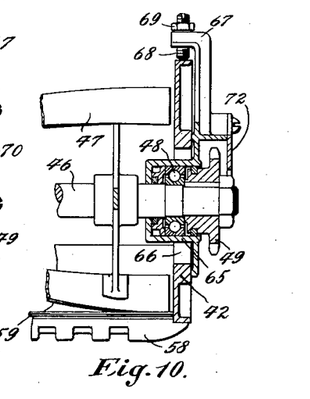
Fig. 10 is a section on line X—X of Fig. 7 through one end of the rotary cutter supporting means.
Figure 11:
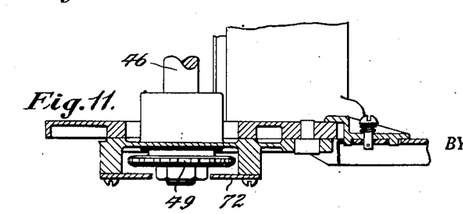
Fig. 11 is a horizontal section on line XI—XI of Fig. 17 through one side of the cutter frame.

Means are provided for adjusting the position of the shoe 58 to thereby vary the height of cut and to hold the parts in position to maintain this height uniform. The means referred to is the link 61, one end of which is secured to the link 50, and the other end of which is pivotally connected at 62 with the side member 42. Several openings 63 are provided in one end of the link 61 and a screw 64, or other suitable means, passes through one of said openings and fastens the link 61 to the link 50. In Fig. 7 the parts are adjusted so that a close cut of grass is made, whereas in Fig. 8 the parts are so adjusted that a long cut is made. In Fig. 7 it will be noted that the screw 64 passes through the last hole in the link 61 whereas in Fig. 8 it passes through the first hole. By varying the holes and the distance between holes any desired adjustment may be secured, and the parts will be held in proper position to maintain a uniform height of cut.

We have arranged novel means for adjusting the relation of the rotary cutters 47 to the stationary cutter 59. By reference to Figs. 9 and 10, it will be noted that the spacing shoe and stationary cutter 59 are mounted in side members 42 and 43 which have large openings 66 therein surrounding the ball bearing brackets 65, pivoted to the side frames 42 and 43 at 65'. Arms 67 extend upwardly from the brackets 65 and overhang the members 42 and 43. Adjustable screws 68 pass through the arms 67 and engage the top of the members 42 and 43. Lock nuts 69 are placed on the upper ends of the screws 68 to securely lock them in position. If it is desired to change the relation of the rotary cutters to the stationary cutter, this can be done by loosening the lock nuts 69 and changing the screws 68, either up or down, to give the desired adjustment whereupon the lock nuts are again screwed into place. Coiled springs 70 are placed operatively between brackets 65 and the side members 42 and 43, said springs 70 tending to hold the rotary cutters 47 in operative relation to the fixed cutter 59 and to hold the screws 68 in contact with the tops of the members 42 and 43. If during the operation of the machine extraneous material, such as the stick 71 shown in Fig. 9, should come between the rotary cutters and the stationary cutter, the bracket 65 will be raised and separate the rotary cutters from the fixed cutter so as to prevent damage to the cutters. This is shown at the right-hand end of Fig. 9, whereas in the left-hand end of that figure the parts are in normal position. The springs 70 may be adjusted so as to control the pressure between the stationary cutter and the rotary cutters. It should be noted that the screws 68 form adjustable stops acting directly towards the pivot 46. By this arrangement, wear may take place at the pivot 65' without affecting the adjustment of the rotary cutters with respect to the stationary cutter.

A guard 72 is placed around the sprocket 49 for safety purposes.

The driving means for the machine as well as the rotary cutters will now be described. On the main shaft of the engine is a sprocket 27 and a drive chain 73 passes over that sprocket and over a large sprocket 74 on a shaft 75. Clutches 76 and 77 are placed on the shaft 75. A sprocket 78 driven by the shaft 75 carries a chain 79 which passes over a sprocket 80 on the cleaning roll 20 carried by the main frame and thence around the sprocket 12 attached to the shaft 11 through which the driving roll is operated.

The rotary cutters are operated by a chain 81 which passes around a sprocket 82 on the shaft 75, thence around an idler sprocket 83 on the main frame, thence around the sprocket 49 on the shaft 46, thence around an idler sprocket 84 on the main frame, back to the sprocket 82. From the foregoing it will be noted that the chain 81 in passing from the sprocket 49 to the idler sprocket 84 is in line with the pivot point of the spacing member 40, or in other words the pitch line of the chain on its tight side crosses the axis of said pivot point, so that if the machine should run from a light growth of grass into a heavy growth, the increased strain on the chain for rotating the cutters would not substantially affect the pressure of the spacing shoe on the grass. By having the pitch line of the driving chain act along the spacing member 40 and across the axis of its pivot, the somewhat delicate balance of weight between the counterbalancing means and the spacing shoe remains undisturbed despite the fact that the cutter passes from light growth to heavy growth and vice versa. Furthermore, it will be noticed that the members 40 and 41 are disposed near the ground and substantially parallel thereto, so that there is no tendency to force the shoe 58 into the ground or to lift it from the ground, due to the force exerted along the members 40 and 41. These members, of course, cause a certain tendency for the cutter frame to rotate about the shoe 58, but the lever arm through which this force acts is short, because of the proximity of the members to the ground, and any tendency to rotate is resisted by the arms 52 and 53.

Figures 12, 13, 14, 15:
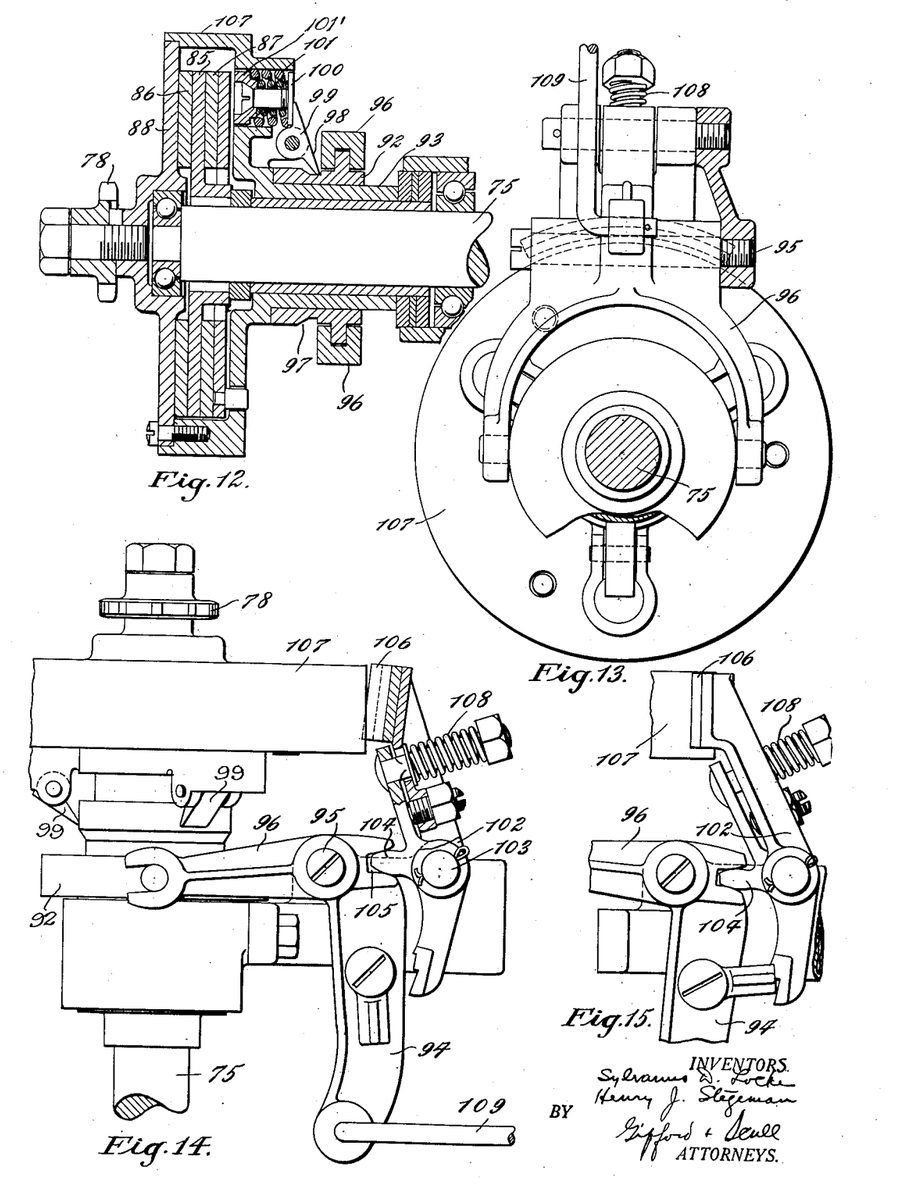

The clutches and operating means therefore are best shown in Figs. 12 to 14, inclusive, and in Fig. 2. Fig. 12 shows a section through the clutch means wherein shaft 75 has a disk 85 splined thereon and arranged to rotate between disks 86 and 87 when the clutch is disengaged. The disks 86 and 87 are connected with the housing 88 which in turn carries the sprocket 78, which drives the chain 79, which in turn drives the sprocket 80, and the sprocket 12 connected to the driving roll 7—8. The control of the clutch is brought about by a sliding sleeve 92 on the member 93 which is loosely mounted on the shaft 75 and secured to the housing 88. A bell crank 94 is pivoted at 95 and the bifurcated end of the bell crank arm 96 engages the sliding sleeve 92 to move the same. The sleeve 92 is provided with a cam surface 97 which engages the ends 98 of members 99. The other ends of the members 99 engage disks 100 and push them to the left, as shown in Fig. 12, against compression springs 101. The springs in turn press members 101' against the disks 87 and thus press disks 85, 86 and 87 together and thereby lock the disk 88 to the shaft 75 and drive the sprocket 89. Because of the employment of the springs 101 to hold the clutch disks together, means are provided whereby the clutch may slip in the event that an undue load should be placed upon it.

Arranged adjacent the bell crank 94 is a member 102 pivoted at 103. A tooth 104 engages a notch 105 in the member 94 so that when the member 94 is moved around its pivot the member 102 is also moved around its pivot. Friction material 106 is placed on one end of the member 102 and arranged so that it engages the brake drum 107, shown as formed integral with the sleeve 93. Springs 108 are interposed between the member 102 and the friction material 106 so that the braking pressure between the material 106 and the drum 107 may be regulated. The parts 94 and 102 are so related that when the control rod 109 is moved to the right in Fig. 14 to engage the clutch the brake material 106 is automatically removed from the drum 107. On the contrary, when the rod 109 is moved to disengage the clutch, the brake is automatically applied. The parts are shown in Fig. 14 with the clutch engaged and the brake released, whereas in Fig. 15 the parts are shown in their positions when the clutch is disengaged and the brake applied.

Figures 1, 3:
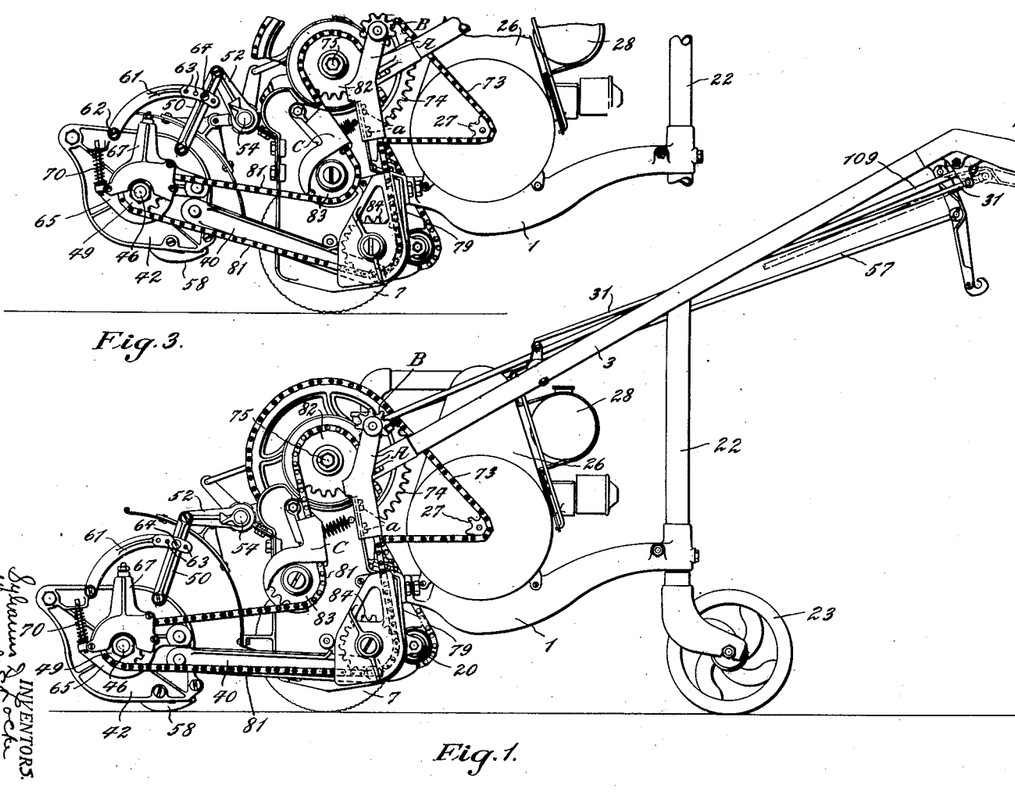
Fig. 1 is a left side elevation of the machine.
Fig. 3 is a side elevation of certain parts of the machine showing the cutter means in raised position.

The clutch structure above described in detail is located at 77, as viewed in Fig. 2. A similar clutch is located on the other side of the machine at 76 for driving the rotary cutters. These clutching means are controlled through the control rods 109 and 110 and the braking means 102 engage housings 107 and 112 acting as brake drums. The interior construction of the clutch 76 is the same as that shown in Figs. 12 to 15, inclusive. The clutch for controlling the rotary cutters is connected with the sprocket 82 over which passes the chain 81, as shown in Fig. 1. It is therefore apparent that the operator can control the operation of the rotary cutters through the rod 110 and the operation of the driving roll through the rod 109. By means of the rod 31 the speed of the engine is controlled and through the rod 57 the arms 52 and 53 may be operated to raise and lower the cutter frame. The operator may therefore operate all of the controls of the machine while in position between the handles 24 and 25.

An important advantage of our machine is that all of the parts which contact with the grass are within the path of the rotary cutters so that no part of the machine engages any uncut grass. This arrangement has many obvious advantages. In addition there are no parts which overhang a substantial distance outside of the path of the rotary cutters so that it is possible and practical to trim closely to all obstructions on the lawn as well as to mow the grass underneath overhanging shrubbery. These features coupled with the ease of handling and other features heretofore described, render the machine one of very great desirability and practical utility.

Figure 20:
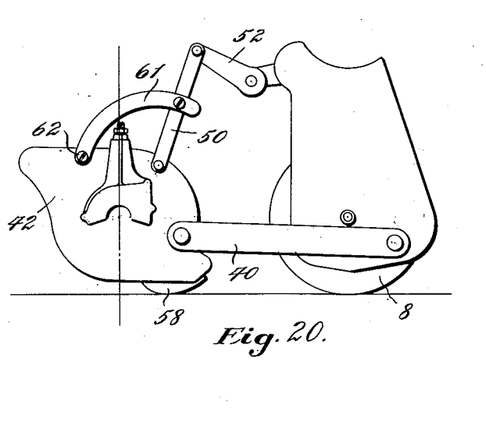
Fig. 20 is a diagrammatic showing of the positions of the parts of the cutter carriage when cutting on level ground.
Figure 21:
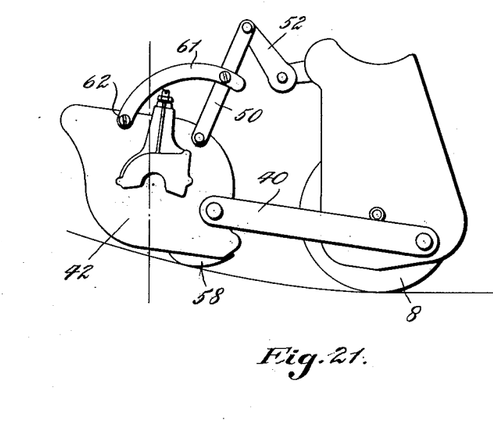
Fig. 21 is a diagrammatic showing of the positions of the parts of the cutter carriage when cutting on an up-grade.

By reference to diagrammatic Figs. 19—22, the chief advantages of the arrangement shown will be apparent. Special attention is directed to Figs. 21 and 22. Fig. 20 shows the parts as they appear when the machine is traveling on approximately level ground. It will be seen that the member 40 is rigid in itself, although pivoted at its opposite ends to the frame of the machine and to the frame of the cutter. The members 50 and 61 are secured rigidly together in adjusted position, so that they form in effect a rigid and integral part of the frame of the cutter. This frame of the cutter is then secured to the frame of the machine by the short arm 52 pivoted at both of its ends, but much shorter than the member 40. This arm also has its outer or front pivot raised to a point above its rear pivot. Then, when the machine strikes a concave surface indicated diagrammatically in Fig. 21, it will be seen that the arm 52 will rotate clockwise about its rear pivot and permit the frame of the cutter to rise as the cutter rides up on the concave surface, at the same time tipping the cutter frame rearwardly to maintain it in proper relation to the concave surface. The member 40 being pivoted at both of its ends will permit this movement, but at the same time will hold the cutter spaced properly in front of the main frame.

Figure 22:
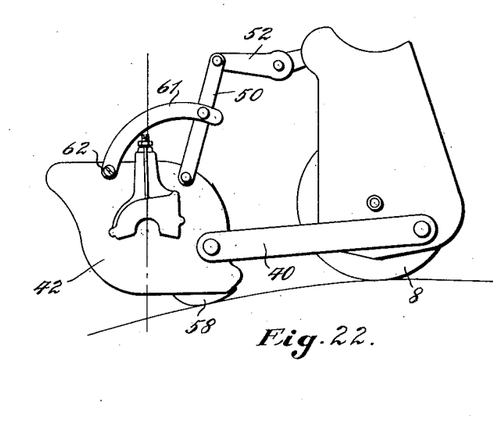
Fig. 22 is a diagrammatic showing of the positions of the parts of the cutter carriage when cutting on a down-grade.

In a similar way, when the cutter strikes a convex surface, such as indicated diagrammatically in Fig. 22, the cutter may drop downwardly and tip forwardly somewhat as indicated in that figure. In both instances, the tipping of the cutter is about the shoe 58, so that the height of cut is maintained approximately uniform, it being remembered that the stationary cutter 59 is mounted directly on the front edge of the shoe.

Looked at in another way, it may be said that the member 40 maintains substantially constant the distance between the center of the rotary cutter and rear pivot of the member 40, whereas the distance between the center of the rotary cutter and the rear pivot of the arm 52 is changed to meet varying conditions of the ground over which the cutter travels. The arrangement just described and illustrated in Figs. 19, 20, 21, and 22 applies only to the left-hand end of the cutter shown in the drawings, at the other end of the cutter the link 61 being omitted so that the two ends of the cutter will not rise and fall together in response to unevenness of the ground. By omitting this link from one end, it is possible for that end to either rise or fall relative to the other end, whereas the end having the link 61 will rise and fall in response to unevenness of the ground in the direction of travel of the machine.

The rotating cutters may be sharpened without dismantling the machine by the following changes.

Referring to Figs. 1 and 3, the cutter frame should be elevated to the position shown in Fig. 3 to slacken the drive chain. The idler bracket A should be removed by loosening the two idler bracket screws $a$. The mower drive chain 81 may then be removed from the drive clutch sprocket 82 and passed around under the clutch sprocket 82 instead of over. It should then pass over the idler sprocket B. The idler bracket A should then be replaced without tightening the screws $a$. The cutter should be lowered to the floor, as shown in Fig. 1, and the reversing idler bracket A should be raised to take all slack out of the chain, and to place tension on the idler 83 carried by bracket C. The idler bracket screws $a$ should then be securely tightened. The blade adjusting screws 68 (Fig. 10) should be loosened to allow the rotary cutters to engage the fixed or stationary cutter, and a suitable medium-grade valve grinding compound should be placed on the edges of the rotating blades. The motor may then be started and throttled down to the lowest possible speed with the tractor clutch disengaged. The mower clutch may then be gradually engaged and the rotating blades rotated against the stationary blades until the desired sharpening has been effected. After the cutters have been sharpened the parts may be placed in their normal position and the machine is again ready for use.

Figures 16, 17, 18:
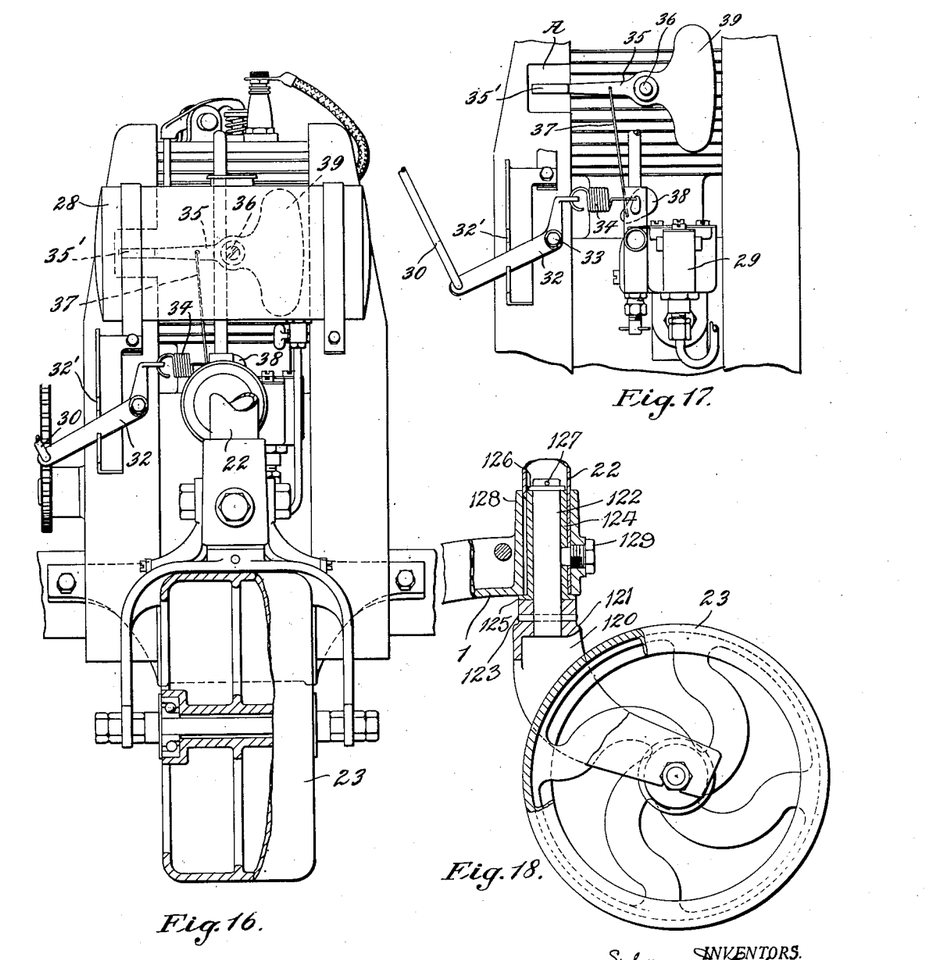
Fig. 16 is a rear elevational view with certain parts removed.
Fig. 17 shows the motor control mechanism.
Fig. 18 shows the caster and its connection to the main frame with certain parts broken away.
Figure 19:
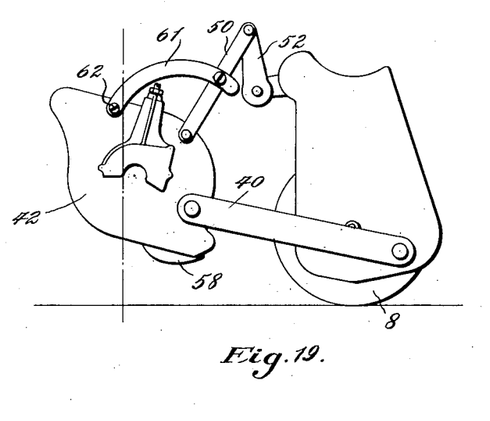
Fig. 19 is a diagrammatic view showing the positions of the parts of the cutter carriage during transportation.

Referring to Fig. 18, we have shown therein a novel method of constructing and arranging the mounting of the caster 23. As plainly shown in that figure, the caster is mounted in a fork 120 having a cross bar 121 in which is secured a post 122. Usually, the fork will be cast and the post will be a forging made as a separate piece, although they may be made as one piece if found desirable. In this form, the post 122 is secured in place as by a pin 123. On the post is a bushing 124 having a flange 125 resting on the bar 121, and held on the post by a washer 126 and a pin 127. The standard 22 is put in place within the bearing 128, and then the post with the bushing thereon is slipped into position within the standard. The parts may be held against displacement by a screw 129 threaded into the bearing and passing through the standard and into an opening in the bushing, it, of course, being understood that this screw does not contact with the post, at least not enough to prevent free rotation of the post in the bushing.

Changes in detail of construction may be made without departing from the spirit of our invention.

We claim:

1. In a lawn mower, cutting means, a main frame, driving means, pivoted means for partially supporting the cutting means from the main frame, a spacing shoe lying back of the cutting means and wholly within the path of the cutting means for fixing the distance of the cutting means from the ground, and spring means tending to counterbalance the weight supported by said pivoted means.

2. In a lawn mower, cutting means, a main frame, driving means, pivoted means for partially supporting the cutting means from the main frame, a spacing shoe lying back of the cutting means and wholly within the path of the cutting means for fixing the distance of the cutting means from the ground, spring means tending to counterbalance the weight supported by said pivoted means, and means for adjusting said spring means.

3. In a lawn mower, cutting means, a main frame, driving means, pivoted means for supporting the cutting means from the main frame, a spacing shoe lying back of the cutting means and wholly within the path of the cutting means for fixing the distance of the cutting means from the ground, spring means tending to counterbalance the weight supported by said pivoted means, and means for adjusting said spring means.

4. In a power lawn mower, a main frame, a rotary cutter, a frame therefore, horizontal arms pivotally connecting said cutter frame to the main frame, and means passing substantially through the axis of the pivotal point of one of said arms to the main frame for propelling the cutter.

5. In a power lawn mower, a main frame, a rotary cutter, a frame therefor, pivoted horizontal spacing links for holding the cutter frame in spaced relation with the main frame and means passing substantially through the axis of the pivotal connection of one of said links to the main frame for propelling the cutter.

6. In a power lawn mower, a main frame, two supports therefor, a cutter frame, a rotary cutter mounted in the cutter frame, pivoted partially counterbalanced means for supporting said cutter frame from the main frame and in spaced relation thereto, a spacing shoe for supporting the non-counterbalanced weight of the cutter frame and means for driving said cutter, said means acting along said pivoted means and passing substantially through said pivot point whereby the driving force for said cutter is substantially ineffective in increasing or decreasing the pressure of said spacing shoe upon the ground.

7. In a power lawn mower, a main frame, two supports therefor, one of which drives the machine, a cutter frame pivotally supported in front of said driving support, means for carrying the major part of the cutter frame weight from the main frame, a spacing piece under said cutter frame carrying the balance of the cutter frame weight and means for driving said cutter without substantially disturbing the distribution of cutter frame weight between the main frame and the spacing piece.

8. In a power lawn mower, a main frame, drive rolls therefor, a differential connecting said rolls, means forming a space circumferentially of said differential between said rolls, an internal combustion engine for driving said machine and an exhaust for said engine arranged to discharge into said space to prevent the accumulation of cut grass therein.

9. In a power lawn mower, a main frame, a driving roll, a cleaning roll closely adjacent said driving roll to clean the same, and means to rotate said cleaning roll.

10. In a power lawn mower, a main frame, a driving roll, a cleaning roll mounted closely adjacent said driving roll and means driving the adjacent surfaces of said rolls in opposite directions.

11. In a lawn mower, a main frame, means to move said frame over the ground, a cutter frame, means pivotally supporting said cutter frame on the main frame and permitting vertical movement of the cutter frame relative to the main frame, a cutter on said cutter frame, said cutter frame having a single ground-contacting member disposed rearwardly of said cutter and entirely within the path cut thereby, means to operate said cutter, and counterbalancing means to transmit a substantial part of the weight of the cutter and its frame to the main frame, and means maintaining the height of cut substantially constant during said vertical movement of the cutter frame.

12. In a lawn mower, a main frame, means to move said frame over the ground, a cutter frame, means pivotally supporting said cutter frame on the main frame and permitting vertical movement of the cutter frame relative to the main fame, a cutter on said cutter frame, said cutter frame having a single ground-contacting member disposed rearwardly of said cutter and entirely within the path cut thereby, means to operate said cutter, and means maintaining the height of cut substantially constant during said vertical movement of the cutter frame.

13. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and connected to the cutter frame, expansible connections between said frames disposed above said spacing members, and means operatively connected with said members and connections to maintain the height of cut substantially uniform.

14. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and connected to the cutter frame and disposed adjacent the ground and substantially parallel thereto, expansible connections between said frames disposed above said spacing members, and means operatively connected with said members and connections to maintain the height of cut substantially uniform.

15. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and to the cutter frame, expansible connections between said frames disposed above said spacing members, a stationary cutting element on said shoe, a rotary cutting element on said frame and cooperating with said stationary element, said expansible connections permitting up and down movement of said cutter frame with respect to the main frame, and means operatively connected with said expansible connections to limit rotative movement of the cutter on said shoe during said up and down movement.

16. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and to the cutter frame, expansible connections between said frames disposed above said spacing members, said spacing members and connections being disposed at both ends of said cutter frame, and means at one end only of the cutter frame and operatively connected with the connection at that end and adapted to maintain the height of cut substantially uniform.

17. In a lawn mower, a main frame, means on said frame for driving the machine over the ground, a cutter disposed in front of said main frame and mounted on a cutter frame, a ground-engaging shoe on said cutter frame and adapted to support part of the weight thereof, spacing members each pivoted to the main frame and to the cutter frame, expansible connections extending forwardly and rearwardly between said frames and disposed above said spacing members, said expansible connections being formed of rigid elements so connected as to lengthen as the machine passes over a convex surface and to shorten as the machine passes over a concave surface, and means operatively connected with said expansible connections to maintain the height of cut substantially uniform.

18. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and to the cutter frame, expansible connections between said frames disposed above said spacing members, said expansible connections being constructed and arranged to lengthen as the machine passes over a convex surface and to shorten as the machine passes over a concave surface, said members and connections being disposed at opposite ends of said cutter, and means operatively connected with the expansible connections at one end only of the cutter and adapted to maintain the height of cut substantially uniform.

19. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and to the cutter frame, expansible connections between said frames disposed above said spacing members, said expansible connections being disposed at opposite ends of said cutter frame and each comprising two members, one of which is an arm pivoted to the main frame and the other of which is a link pivoted to said arm and to said cutter frame, and means at one end only of said cutter frame preventing pivotal movement between said link and the cutter frame.

20. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and to the cutter frame, expansible connections between said frames disposed above said spacing members, said expansible connections being disposed at opposite ends of said cutter frame and each comprising two members, one of which is an arm pivoted to the main frame and the other of which is a link pivoted to said arm and to said cutter frame, the pivot between said arm and said link being always disposed on one side of a line drawn from the pivot on the main frame to the pivot on the cutter frame, and means at one end only of said cutter frame preventing pivotal movement between said link and the cutter frame.

21. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and to the cutter frame, expansible connections between said frames disposed above said spacing members, said expansible connections being disposed at opposite ends of said cutter frame and each comprising two members, one of which is an arm pivoted to the main frame and the other of which is a link pivoted to said arm and to said cutter frame, the pivot between said arm and link being always disposed above a line drawn from the pivot on the main frame to the pivot on the cutter frame, means to transmit a substantial part of the weight of the cutter and its frame to the main frame, and means at one end only of said cutter frame preventing pivotal movement between said link and the cutter frame.

22. In a lawn mower, a main frame, means on said frame for driving the machine over the ground, a cutter mounted on a cutter frame, a ground-engaging shoe on said cutter frame and adapted to support part of the weight thereof, means to transmit a substantial part of the weight of the cutter and its frame to the main frame, spacing members each pivoted to the main frame and to the cutter frame, expansible connections between said frames disposed above said spacing members, and means associated with said connections to maintain the height of cut substantially uniform.

23. In a lawn mower, a main frame, means on said frame for driving the machine over the ground, a cutter mounted on a cutter frame, a ground-engaging shoe on said cutter frame and adapted to support part of the weight thereof, spacing members each pivoted to the main frame and to the cutter frame, expansible connections between said frames disposed above said spacing members, said expansible connections being disposed at opposite ends of said cutter frame and each comprising two members, one of which is an arm pivoted to the main frame and the other of which is a link pivoted to said arm and to said cutter frame, means at one end only of said cutter frame preventing pivotal movement between said link and the cutter frame, and means for adjusting said last-named means to turn the cutter frame on its pivotal connection to said link.

24. In a lawn mower, a main frame and a cutter frame disposed in front thereof, a motor on said main frame, a rotary cutter on said cutter frame, a spacing member pivotally connected at opposite ends to said frames, means transmitting a substantial part of the weight of the cutter frame to the main frame, and means to drive said rotary cutter from the main frame, said driving means transmitting its driving force in a substantially straight line passing through the axis of the pivot between said spacing member and the main frame.

25. In a lawn mower, a main frame and a cutter frame disposed in front thereof, a motor on said main frame, a rotary cutter on said cutter frame, a spacing member pivotally connected at opposite ends to said frames, means transmitting a substantial part of the weight of the cutter frame to the main frame, and means to drive said rotary cutter from the main frame, said driving means being constructed and arranged to prevent rotative movement of said spacing member around its pivotal connection to the main frame by the force exerted by said driving means.

26. In a lawn mower, a main frame and a cutter frame disposed in front thereof, a motor on said main frame, a rotary cutter on said cutter frame, a spacing member pivotally connected at opposite ends to said frames, means transmitting a substantial part of the weight of the cutter frame to the main frame, means to drive said rotary cutter from the main frame, said driving means comprising a sprocket on said rotary cutter, and a chain driving said sprocket and having its pitch line on its tight side substantially crossing the axis of the pivot which connects the spacing member to the main frame.

27. In a lawn mower, a main frame and a cutter frame disposed in front thereof, a motor on said main frame, a rotary cutter on said cutter frame, a spacing member pivotally connected at opposite ends to said frames, and means to drive said rotary cutter from the main frame, said driving means being constructed and arranged to prevent rotative movement of said spacing member around its pivotal connection to the main frame by the force exerted by said driving means.

28. In a lawn mower, a main frame and a cutter frame disposed in front thereof, a motor on said main frame, a rotary cutter on said cutter frame, a spacing member pivotally connected at opposite ends to said frames, means to drive said rotary cutter from the main frame, said driving means comprising a sprocket on said rotary cutter, and a chain driving said sprocket and having its pitch line substantially crossing the axis of the pivot which connects the spacing member to the main frame.

29. In a lawn mower, a main frame and a cutter frame disposed in front thereof, a motor on said main frame, a rotary cutter on said cutter frame, means pivotally connecting said frames, means to drive said rotary cutter from the main frame, said driving means comprising a sprocket on said rotary cutter, and a chain driving said sprocket and having its pitch line substantially crossing the axis of the pivot which connects the spacing member to the main frame.

30. In a lawn mower, a main frame, rotatable ground-engaging rolls supporting said frame, a ground-engaging caster mounted on said frame and disposed rearwardly of said rolls, a cutter frame disposed in front of the main frame and having a rotary cutter thereon, means pivotally connecting said frames, ground-engaging means carried by said cutter frame and disposed entirely to the rear of the cutter and within the width of cut, and means independent of said rolls to drive said cutter.

31. In a lawn mower, a main frame, rotatable ground-engaging rolls supporting said frame, a ground-engaging caster mounted on said frame and disposed rearwardly of said rolls, a cutter frame disposed in front of the main frame and having a rotary cutter thereon, means pivotally connecting said frames, counterbalancing means transmitting a substantial part of the weight of the cutter frame to the main frame, ground-engaging means carried by said cutter frame entirely to the rear of the cutter, and means to drive said cutter.

32. In a lawn mower, a main frame, rotatable ground-engaging rolls supporting said frame, a ground-engaging caster mounted on said frame and disposed rearwardly of said rolls, a cutter frame disposed in front of the main frame and having a rotary cutter thereon, means pivotally connecting said frames, counterbalancing means transmitting a substantial part of the weight of the cutter frame to the main frame, a ground-engaging shoe carried by said cutter frame entirely to the rear of the rotary cutter, a stationary cutter on said shoe and cooperating with said rotary cutter, and means to drive said rotary cutter.

33. In a lawn mower, a main frame, rotatable ground-engaging rolls supporting said frame, a ground-engaging caster mounted on said frame and disposed rearwardly of said rolls, a cutter frame disposed in front of the main frame, means pivotally connecting said frames, a rotary cutter carried by said cutter frame, a ground-engaging shoe carried by said cutter frame entirely to the rear of the rotary cutter, a stationary cutter on said shoe and cooperating with said rotary cutter, means to drive said rotary cutter, and means to adjust said cutter frame about said shoe to vary the height of cut.

34. In a lawn mower, a main frame, rotatable ground-engaging rolls supporting said frame, a ground-engaging caster mounted on said frame and disposed rearwardly of said rolls, a cutter frame disposed in front of the main frame, means pivotally connecting said frames, a rotary cutter carried by said cutter frame, a ground-engaging shoe carried by said cutter frame entirely to the rear of the rotary cutter, a stationary cutter on said shoe and cooperating with said rotary cutter, means to drive said rotary cutter, and means to transmit a substantial part of the weight of the cutters and their frame to the main frame.

35. In a lawn mower, a cutter frame, a stationary cutter on said frame, a rotary cutter cooperating with said stationary cutter, a bearing for said rotary cutter, a bracket carrying said bearing, means pivotally supporting said bracket on said frame, means resiliently acting on said bracket to rotate it on its pivot and thereby bring the rotary cutter nearer to the stationary cutter, and a stop limiting said movement and acting in a line passing substantially through said bearing.

36. In a lawn mower, a frame having a vertically extending bearing and a ground-engaging caster having a vertically extending post disposed in said bearing, said post having a bushing rotatably mounted thereon, means on the post preventing substantial movement of the bushing lengthwise of the post, and means to hold said bushing in said bearing without preventing rotation of said post therein.

37. In a lawn mower, a frame having a vertically extending bearing and a ground-engaging caster having a vertically extending post disposed in said bearing, said post having a bushing rotatably secured thereto but held against movement longitudinally thereof, means to hold said bushing in said bearing without preventing rotation of said post therein, and a standard disposed in said bearing between the bushing and the wall of the bearing.

38. In a lawn mower, a frame having a rearwardly extending portion provided with a vertically disposed bearing, a ground-engaging caster having a vertically extending post received in said bearing, a washer adjacent the end of said post, means on the post preventing removal of said washer, and a bushing held in place on said post by said washer.

39. In a power driven lawn mower, a traction means, a main frame supported by said means, a motor on the main frame, a driving connection between the motor and said means, a cutter frame, cooperating rotary and stationary cutter means in said cutter frame, a driving connection between the motor and the rotary cutter means, means connecting the cutter frame to the main frame whereby the cutter frame moves with the main frame, means transferring a portion of the weight of the cutters and cutter frame to the main frame, and said cutter frame including a single ground engaging element supporting the untransferred portion of the weight of the cutter and cutter frame and comprising a ground engaging shoe located below and closely adjacent the stationary cutter means.

40. In a power driven lawn mower, a traction means, a main frame supported by said means, a motor on the main frame, a driving connection between the motor and said means, a cutter frame, cooperating rotary and stationary cutter means in said cutter frame, a driving connection between the motor and the rotary cutting means, means connecting the cutter frame to the main frame whereby the cutter frame moves with the main frame, and means transferring a portion of the weight of the cutters and cutter frame to the main frame, said cutter frame including a single ground engaging element supporting the untransferred portion of the weight of the cutters and cutter frame, said element comprising a ground engaging shoe located below and closely adjacent the stationary cutter means and having its ground engaging surface provided with grooves extending in the direction of travel of the mower.

41. In a power driven lawn mower, a traction means, a main frame supported by the traction means, a motor on the main frame and having driving connection with the traction means, a cutter frame, a rotary and a stationary cutter in said frame, means connecting the cutter frame to the main frame, said means including a pair of substantially parallel arms each pivoted at one end to the main frame and at its other end to the cutter frame, said arms being arranged substantially horizontally, the connections between the arms and the cutter frame being at points in a plane between the stationary cutter and the axis of the rotary cutter, and a driving connection between the motor and rotary cutter.

42. In a power driven lawn mower, a traction means, a main frame supported by the traction means, a motor on the main frame and having driving connection with the traction means, a cutter frame, a rotary and a stationary cutter means in said cutter frame, means connecting the cutter frame with the main frame whereby the cutter frame moves with the main frame, means counterbalancing the cutters and cutter frame and transferring a portion of the weight thereof to the main frame, a ground engaging shoe on the cutter frame and supporting the remainder of the weight thereof, said ground engaging shoe being arranged closely adjacent the stationary cutter, said means connecting the cutter frame with the main frame including a pair of substantially parallel arms arranged at the sides of the frames and each pivoted at one end to the main frame and at the other end to the cutter frame, said arms being arranged substantially horizontally and pivoted to the cutter frame at a point above the ground engaging shoe and laterally of the axis of the rotary cutter whereby the cutter frame may be rocked on its shoe to shorten or lengthen the distance between the active edge of the stationary cutter and the ground, means for rocking the cutter frame on said shoe, and means for driving the rotary cutter from the motor.

43. In a power driven lawn mower, a traction means, a main frame supported by the traction means, a motor on the main frame and having driving connection with the traction means, a cutter frame, a rotary and a stationary cutter means in said cutter frame, means connecting the cutter frame with the main frame whereby the cutter frame moves with the main frame, means counterbalancing the cutters and the cutter frame and transferring a portion of the weight thereof to the main frame, a ground engaging shoe on the cutter frame and supporting the remainder of the weight thereof, said ground engaging shoe being arranged closely adjacent the stationary cutter, said means connecting the cutter frame with the main frame including a pair of substantially parallel arms disposed one at each side of the frames and each pivoted at one end to the main frame and at the other end to the cutter frame, said arms being arranged substantially horizontally and pivoted to the cutter frame at a point above the ground engaging shoe and laterally of the axis of the rotary cutter whereby the cutter frame may be rocked on its shoe to shorten or lengthen the distance between the active edge of the stationary cutter and the ground, means at one side of said frames for rocking the cutter frame on said shoe, and means for driving the rotary cutter from the motor and including a chain having its pitch line on its tight side substantially crossing the axis of the pivot which secures one of said connecting arms with the main frame.

44. In a lawn mower, a cutter frame comprising spaced end members and rigid means connecting the end members, a stationary cutter on said frame, a rotary cutter cooperating with the stationary cutter and disposed above the same, a bearing for the rotary cutter and movable with respect to the frame whereby the rotary cutter may be moved away from the stationary cutter, means for mounting the bearings on the end members, said means including a bracket on each end member, a pivot for each bracket, said pivots being arranged at one side of the axis of the rotary cutter, a spring means engaging each of said brackets at the opposite side of the axis of the rotary cutter and normally acting to rock the brackets about their pivots to move the rotary cutter toward the stationary cutter but adapted to compress to permit the rotary cutter at either of its ends to move away from the stationary cutter, and each of said brackets including a portion disposed directly above its bearing for the rotary cutter and overlying a part of the end members to limit the movement of the rotary cutter toward the stationary cutter.

45. In a lawn mower, a cutter frame comprising spaced end members and rigid means connecting the end members, a stationary cutter on said frame, a rotary cutter cooperating with the stationary cutter and disposed above the same, a bearing for the rotary cutter and movable with respect to the frame whereby the rotary cutter may be moved away from the stationary cutter, means for mounting the bearings on the end members, said means including a bracket on each end member, a pivot for each bracket, said pivots being arranged at one side of the axis of the rotary cutter, a spring means engaging each of said brackets at the opposite side of the axis of the rotary cutter and normally acting to rock the brackets about their pivots to move the rotary cutter toward the stationary cutter but adapted to compress to permit the rotary cutter at either of its ends to move away from the stationary cutter, and each of said brackets including a portion disposed directly above its bearing for the rotary cutter and overlying a part of the end members, and adjustable means passing through the overlying portions of the brackets and engaging the upper edges of the end members in line with the bearings to limit movement of the rotary cutter toward the stationary cutter.

46. In a lawn mower, a cutter frame having a stationary cutter thereon, said cutter having a transversely extending cutting edge, a bracket having a rotary cutter mounted thereon, and means above the axis of said rotary cutter for suspending the bracket on the cutter frame and for limiting approach of the rotary cutter to the stationary cutter, said suspension means acting substantially in line with said axis and said cutting edge.

47. In a lawn mower, a cutter frame having a stationary cutter thereon, said cutter having a transversely extending cutting edge, a bracket having a rotary cutter mounted thereon, and a plurality of bearings supporting the bracket on the frame, one of said bearings being a pivot and the other being a stop spaced from the pivot and disposed above the axis of the rotary cutter and constructed and arranged to limit approach of the rotary cutter to the stationary cutter.

48. In a lawn mower, a cutter frame having a stationary cutter thereon, said cutter having a transversely extending cutting edge, a bracket having a rotary cutter mounted thereon, and a plurality of bearings supporting the bracket on the frame, one of said bearings being a pivot disposed behind said cutting edge and the other being a stop spaced from the pivot and disposed above the axis of the rotary cutter and constructed and arranged to limit approach of the rotary cutter to the stationary cutter.

49. In a lawn mower, a cutter frame having a stationary cutter thereon, said cutter having a transversely extending cutting edge, a bracket having a rotary cutter mounted thereon, and a plurality of bearings supporting the bracket on the frame, one of said bearings being a pivot disposed behind said cutting edge and the other being a stop spaced from the pivot and disposed above the axis of the rotary cutter and constructed and arranged to limit approach of the rotary cutter to the stationary cutter while permitting limited movement of the bracket on the pivot to move the rotary cutter away from the stationary cutter.

50. In a lawn mower, a cutter frame having a stationary cutter thereon, said cutter having a transversely extending cutting edge, a bracket having a rotary cutter mounted thereon, and a plurality of bearings supporting the bracket on the frame, one of said bearings being located above the axis of the rotary cutter in such a position as to prevent approach of the rotary cutter to the stationary cutter irrespective of any looseness in the other bearings.

51. In a power driven lawn mower, a traction means, a main frame supported by the traction means, a motor on the main frame and having driving connection with the traction means, a cutter frame, a rotary and a stationary cutter means in said cutter frame, means connecting the cutter frame with the main frame whereby the cutter frame moves with the main frame, means counterbalancing the cutters and cutter frame and transferring a portion of the weight thereof to the main frame, a ground engaging shoe on the cutter frame and supporting the remainder of the weight thereof, said ground engaging shoe being arranged closely adjacent the stationary cutter, said means connecting the cutter frame with the main frame including a pair of substantially parallel arms arranged at the sides of the frames and each pivoted at one end to the main frame and at the other end to the cutter frame, said arms being arranged substantially horizontally and pivoted to the cutter frame at a point above the ground engaging shoe and laterally of the axis of the rotary cutter, said counterbalancing means including a rockable horizontally arranged rod on the main frame, a pair of arms secured to said rod, a link connecting each of said arms to the cutter frame, said links being pivoted to the respective arms and to the cutter frame, the pivotal connections between the links and the cutter frame being disposed above and laterally of the pivotal connections between the substantially horizontal connecting arms and the cutter frame whereby as the links are raised and lowered by rocking movement of said rod the cutter frame is rocked on its ground engaging shoe to raise or lower the stationary cutter with respect to the ground, a spring acting on said rod, and a driving connection between the motor and the rotary cutter.

52. In a power driven lawn mower, a traction means, a main frame supported by the traction means, a motor on the main frame and having driving connection with the traction means, a cutter frame, a rotary and a stationary cutter means in said cutter frame, means connecting the cutter frame with the main frame whereby the cutter frame moves with the main frame, means counterbalancing the cutters and cutter frame and transferring a portion of the weight thereof to the main frame, a ground engaging shoe on the cutter frame and supporting the remainder of the weight thereof, said ground engaging shoe being arranged closely adjacent the stationary cutter, said means connecting the cutter frame with the main frame including a pair of substantially parallel arms arranged at the sides of the frames and each pivoted at one end to the main frame and at the other end to the cutter frame, said arms being arranged substantially horizontally and pivoted to the cutter frame at a point above the ground engaging shoe and laterally of the axis of the rotary cutter, said counterbalancing means including a rockable horizontally arranged rod on the main frame, a pair of arms secured to said rod, a link connecting each of said arms to the cutter frame, said links being pivoted to the respective arms and to the cutter frame, the pivotal connections between the links and the cutter frame being disposed above and laterally of the pivotal connections between the substantially horizontal connecting arms and the cutter frame whereby as the links are raised and lowered by rocking movement of said rod the cutter frame is rocked on its ground engaging shoe to raise or lower the stationary cutter with respect to the ground, a spring acting on said rod, a member secured to one end of the cutter frame and to one of said links, the connection between said member and the cutter frame and the connection between the member and the link being spaced from the pivotal connection between the link and cutter frame and the connection between the member and link being adjustable whereby to rock the cutter frame on its ground engaging shoe to vary the height of the stationary cutter from the ground and thus vary the height of the cut, and a driving connection between the motor and the rotary cutter.

53. In a lawn mower, a traction means, a main frame on said means, a motor on the frame and having driving connection with the means, a cutter frame having a cutter mounted thereon, a ground engaging shoe on the cutter frame and adapted to support part of the weight thereof, spacing members each pivoted to the main frame and to the cutter frame, expansible connections between said frames disposed above said spacing members, said expansible connections including a rod rockably and horizontally supported on the main frame and means disposed at opposite ends of the cutter frame, said last means each comprising two members one of which is an arm pivotally mounted on the main frame by said rod and the other of which is a link pivoted to said arm and to the cutter frame, and spring means acting on said rockable rod and serving to transmit a portion of the weight of the cutter and cutter frame to the main frame.

54. In a lawn mower, a main frame and a cutter frame pivotally connected together, a ground engaging member on said cutter frame, means transmitting a substantial part of the weight of the cutter frame to the main frame, a motor on said main frame, a rotary cutter on said cutter frame, a driving connection betwen said motor and said rotary cutter, and means preventing changing of the pressure exerted by said ground engaging member upon the ground by the driving of the rotary cutter.

55. In a power lawn mower, a main frame, a rotary cutter, a frame for the cutter, arms pivotally connecting the cutter frame to the main frame, a sprocket on the shaft of the rotary cutter, an idler on the main frame, a chain passing over said idler and sprocket, means driving said chain, one of said arms being pivoted to the main frame on a pivot separate from the shaft of the idler, and said pivot being arranged in line with the pull of the chain betwen the cutter sprocket and the idler.

56. In a power lawn mower, a main frame, a rotary cutter, a frame for the cutter, arms pivotally connecting the cutter frame to the main frame, a sprocket on the shaft of the rotary cutter, a sprocket on the main frame, a chain trained over said sprocket, one of said arms being pivoted on the main frame on a pivot separate from the shaft of the sprocket on the main frame, and said pivot being arranged in line with the pull of the chain between said sprockets.

57. As a ground engaging support for a cutter frame of a lawn mower, a shoe having a ground engaging surface with grooves therein extending in the direction of movement of the shoe in its passage over the ground.

58. As a ground engaging support for a cutter frame of a lawn mower, a shoe having a ground engaging surface with grooves therein extending in the direction of movement of the shoe in its passage over the ground, said surface being curved in the direction of said movement.

59. As a ground engaging support for a cutter frame of a lawn mower, a shoe having a ground engaging surface with grooves therein extending in the direction of movement of the shoe in its passage over the ground, said grooves being as wide at the back of the shoe as at the front thereof whereby stones or other hard objects will not wedge in grooves.

SYLVANUS D. LOCKE.
HENRY J. STEGEMAN.